(12) United States Patent
Horiba et al.

(10) Patent No.: US 12,118,034 B2
(45) Date of Patent: *Oct. 15, 2024

(54) MATCHING RESULT DISPLAY DEVICE, MATCHING RESULT DISPLAY METHOD, PROGRAM, AND RECORDING MEDIUM

(71) Applicant: NEC Corporation, Tokyo (JP)

(72) Inventors: Yuji Horiba, Tokyo (JP); Masanori Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,946

(22) Filed: Oct. 30, 2023

(65) Prior Publication Data
US 2024/0071129 A1  Feb. 29, 2024

Related U.S. Application Data

(63) Continuation of application No. 17/443,029, filed on Jul. 20, 2021, which is a continuation of application (Continued)

(30) Foreign Application Priority Data

Mar. 28, 2012  (JP) .................. 2012-074711

(51) Int. Cl.
*G06F 16/583* (2019.01)
*G06F 16/903* (2019.01)
(Continued)

(52) U.S. Cl.
CPC ...... *G06F 16/5854* (2019.01); *G06F 16/5838* (2019.01); *G06F 16/90335* (2019.01);
(Continued)

(58) Field of Classification Search
None
See application file for complete search history.

(56) References Cited

U.S. PATENT DOCUMENTS

| 4,646,352 A | 2/1987 | Asai et al. |
| 6,690,397 B1 | 2/2004 | Daignault, Jr. |

(Continued)

FOREIGN PATENT DOCUMENTS

| EP | 1 445 727 A1 | 8/2004 |
| JP | 2003-036443 | 2/2003 |

(Continued)

OTHER PUBLICATIONS

International Search Report mailed Oct. 30, 2012.
(Continued)

*Primary Examiner* — Alex Gofman
*Assistant Examiner* — Umar Mian
(74) *Attorney, Agent, or Firm* — Sughrue Mion, PLLC

(57) ABSTRACT

The present invention provides a matching result display device, a matching result display method, a program, and a recording medium, which allow, at the time of displaying feature points of objects determined as matching on the basis of matching result information provided by a matching system, visual check of the displayed feature points to be performed easily. The matching result display device according to the present invention includes: a feature point acquiring unit that acquires a plurality of feature points common to at least two pieces of image data to be matched against each other; a display position setting unit that sets display positions of corresponding symbols to be assigned to the feature points common to the at least two pieces of image data in such a manner that, when the same corresponding symbols are assigned to corresponding feature points, respectively, a display line connecting each feature point and (Continued)

the corresponding symbol assigned thereto on each of the at least two piece of image data does not overlap with display lines connecting other feature points and corresponding symbols assigned thereto, respectively; and a display unit that provides the corresponding symbols at the display positions and displays the feature points and the corresponding symbols assigned thereto in a state where they are connected with display lines, respectively.

19 Claims, 4 Drawing Sheets

Related U.S. Application Data

No. 14/387,898, filed as application No. PCT/JP2012/075373 on Oct. 1, 2012, now Pat. No. 11,106,724.

(51) Int. Cl.
*G06F 18/22* (2023.01)
*G06V 10/98* (2022.01)
*G06V 40/12* (2022.01)

(52) U.S. Cl.
CPC ............ *G06F 18/22* (2023.01); *G06V 10/987* (2022.01); *G06V 40/1347* (2022.01); *G06V 40/1353* (2022.01); *G06V 40/1365* (2022.01); *G06V 40/1371* (2022.01)

(56) References Cited

U.S. PATENT DOCUMENTS

| 7,151,846 | B1 | 12/2006 | Fujii ................. G06V 40/1365 382/125 |
| 7,333,641 | B2 | 2/2008 | Hara et al. |
| 8,891,836 | B2 | 11/2014 | Hara et al. |
| 2001/0044795 | A1 | 11/2001 | Cohen et al. |
| 2003/0037034 | A1 | 2/2003 | Daniels et al. |
| 2003/0222872 | A1 | 12/2003 | Lin |
| 2004/0101173 | A1 | 5/2004 | Hara et al. |
| 2004/0161135 | A1 | 8/2004 | Sano ................. G06V 40/1365 382/124 |
| 2004/0258284 | A1 | 12/2004 | Daniel et al. |
| 2005/0055357 | A1 | 3/2005 | Campbell |
| 2007/0136406 | A1 | 6/2007 | Softky |
| 2008/0068398 | A1 | 3/2008 | Nickolayev |
| 2008/0163087 | A1 | 7/2008 | Cheng et al. |
| 2009/0112825 | A1 | 4/2009 | Xu |
| 2009/0237405 | A1 | 9/2009 | Hayashi ................ G06T 11/206 345/440 |
| 2012/0051634 | A1 | 3/2012 | Chong et al. |
| 2012/0057765 | A1 | 3/2012 | Hara et al. |
| 2016/0154550 | A1 | 6/2016 | Nomoto |

FOREIGN PATENT DOCUMENTS

| JP | 2003036443 A | 2/2003 | |
| JP | 2004-078434 | 3/2004 | |
| JP | 2005-322041 | 11/2005 | |
| WO | WO1982001434 | 4/1982 | ............ G06V 40/12 |
| WO | WO 2010/109994 A1 | 9/2010 | |
| WO | WO 2011/024927 A1 | 3/2011 | |

OTHER PUBLICATIONS

Office Action mailed on Aug. 14, 2015 by the Japanese Patent Office in counterpart Japanese Patent Application No. 2014-507312.
Wilder, Harris Hawthorne, and Bert Wentworth, "Personal identification: methods for the identification of individuals, living or dead", RG Badger, 1918. pp. 268-291. Retrieved on May 5, 2020 from the Internet Archive, https://archive.org/details/personalidentifi00wild/page/282/mode/2up. (Year 1918).
Godsell, J. "Fingerprint techniques." Journal of the Forensic Science Society 3.2 (1963): 79-87. (Year: 1963).
US Office Action for U.S. Appl. No. 17/443,029 mailed on Aug. 1, 2022.
US Office Action for U.S. Appl. No. 14/387,898 mailed on Nov. 12, 2020.

MATCHING RESULT DISPLAY DEVICE, MATCHING RESULT DISPLAY METHOD, PROGRAM, AND RECORDING MEDIUM

CROSS-REFERENCE TO RELATED PATENT APPLICATIONS

This application is a continuation of U.S. patent application Ser. No. 17/443,029, filed Jul. 20, 2021, which is a continuation of U.S. patent application Ser. No. 14/387,898, filed Sep. 25, 2014, which issued as U.S. Pat. No. 11,106,724, which is a National Stage Entry of International Application No. PCT/JP2012/075373, filed Oct. 1, 2012, which claims priority from Japanese Patent Application No. 2012-074711, filed Mar. 28, 2012. The entire contents of the above-referenced applications are expressly incorporated herein by reference.

TECHNICAL FIELD

The present invention relates to a matching result display device, a matching result display method, a program, and a recording medium.

BACKGROUND ART

When personal authentication is performed in criminal investigation etc., biological features such as fingerprints and palm prints are used. A latent palm print or the like collected in a crime scene etc. is subjected to a matching process. Then, when the matching result is examined by visual observation in a court or the like, a document showing the matching result is submitted as evidence. In this document, it is necessary that the latent palm print and the candidate registered palm print are shown in comparison with identification of which of feature points match each other between these palm prints (see Patent Document 1, for example).

CITATION LIST

Patent Document(s)

Patent Document 1: JP 2005-322041 A

SUMMARY OF THE INVENTION

Problem to be Solved by the Invention

In the course of preparing this document, an operator, e.g., an investigator for things left on the scene, has to arrange feature points subjected to an automatic matching process by a system, as well as feature points added and/or corrected by the operator, one by one manually in order to allow easy checking of these feature points as forensic evidence to be presented in a court or the like. FIG. 6A shows an example of an automatically-prepared matching result. Feature points and the numbers assigned thereto are connected with lines, respectively. However, many of these lines cross each other, and this makes the matching result confusing. Thus, in order to make visual check of such a matching result easier, the operator has to change the arrangement of the lines manually to provide the state as shown in FIG. 6B.

With the foregoing in mind, it is an object of the present invention to provide a matching result display device, a matching result display method, a program, and a recording medium, which allow, at the time of displaying feature points of objects determined as matching on the basis of matching result information provided by a matching system, visual check of the displayed feature points to be performed easily.

Means for Solving Problem

In order to achieve the above object, the present invention provides a matching result display device including: a feature point acquiring unit that acquires a plurality of feature points common to at least two pieces of image data to be matched against each other; a display position setting unit that sets display positions of corresponding symbols to be assigned to the feature points common to the at least two pieces of image data in such a manner that, when the same corresponding symbols are assigned to corresponding feature points, respectively, a display line connecting each feature point and the corresponding symbol assigned thereto on each of the at least two piece of image data does not overlap with display lines connecting other feature points and corresponding symbols assigned thereto, respectively; and a display unit that provides the corresponding symbols at the display positions and displays the feature points and the corresponding symbols assigned thereto in a state where they are connected with display lines, respectively.

The present invention also provides a matching result display method including: a feature point acquiring step of acquiring a plurality of feature points common to at least two pieces of image data to be matched against each other; a display position setting step of setting display positions of corresponding symbols to be assigned to the feature points common to the at least two pieces of image data in such a manner that, when the same corresponding symbols are assigned to corresponding feature points, respectively, a display line connecting each feature point and the corresponding symbol assigned thereto on each of the at least two piece of image data does not overlap with display lines connecting other feature points and corresponding symbols assigned thereto, respectively; and a display step of providing the corresponding symbols at the display positions and displaying the feature points and the corresponding symbols assigned thereto in a state where they are connected with display lines, respectively.

The present invention also provides a program that can execute the matching result display method according to the present invention on a computer.

The present invention also provides a recording medium having recorded thereon the program according to the present invention.

Effects of the Invention

According to the present invention, it is possible to provide a matching result display device, a matching result display method, a program, and a recording medium, which allow, at the time of displaying feature points of objects determined as matching on the basis of matching result information provided by a matching system, visual check of the displayed feature points to be performed easily.

MODE FOR CARRYING OUT THE INVENTION

Figure 1:
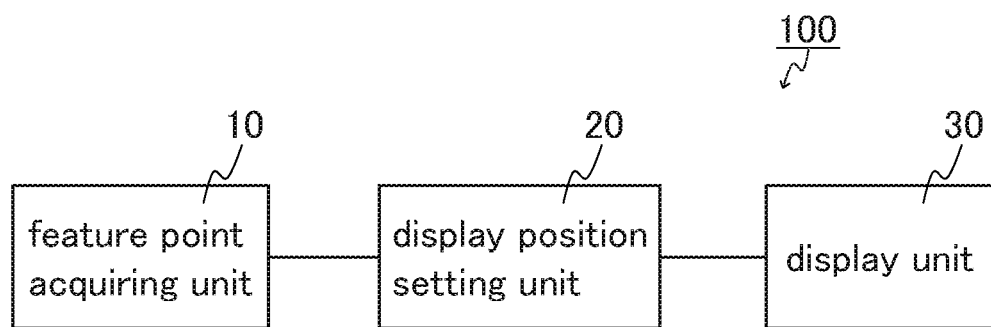
FIG. 1 is a block diagram showing an example of the configuration of the matching result display device of the present invention.

In the matching result display device of the present invention, the display position setting unit preferably is configured so that: it determines straight lines that pass through the plurality of feature points, respectively, with the center of the image data as a starting point; and it sets, as corresponding symbol arrangement positions, positions that are on the straight lines within a corresponding symbol displayable region on the image data. In the matching result display method of the present invention, the display position setting step preferably includes the steps of: determining straight lines that pass through the plurality of feature points, respectively, with the center of the image data as a starting point; and setting, as corresponding symbol arrangement positions, positions that are on the straight lines within a corresponding symbol displayable region on the image data.

In the matching result display device of the present invention, the display position setting unit preferably is configured so that: it acquires feature point distribution information for each of the at least two pieces of image data to set, on the basis of the feature point distribution information, the center point of distribution of the feature points for each of the at least two pieces of image data; it determines straight lines that pass through the plurality of feature points, respectively, with the center point as a starting point; and it sets, as corresponding symbol arrangement positions, positions that are on the straight lines within a corresponding symbol displayable region on the image data. In the matching result display method of the present invention, the display position setting step preferably includes the steps of: acquiring feature point distribution information for each of the at least two pieces of image data to set, on the basis of the feature point distribution information, the center point of distribution of the feature points for each of the at least two pieces of image data; determining straight lines that pass through the plurality of feature points, respectively, with the center point as a starting point; and setting, as corresponding symbol arrangement positions, positions that are on the straight lines within a corresponding symbol displayable region on the image data.

In the matching result display device of the present invention, the display position setting unit preferably is configured so that: it sets display positions of corresponding symbols assigned to the plurality of feature points sequentially; and when there is a feature point to which a corresponding symbol whose display position has already been set is assigned, it adjusts, at the time of setting a display position of a corresponding symbol to be assigned subsequently, the display position of the corresponding symbol to be assigned subsequently in such a manner that a display line connecting the corresponding symbol to be assigned subsequently and a feature point to which the corresponding symbol is assigned does not cross or overlap with a display line connecting the corresponding symbol whose display position has already been set and the feature point to which the corresponding symbol is assigned. In the matching result display method of the present invention, the display position setting step preferably includes the steps of: setting display positions of corresponding symbols assigned to the plurality of feature points sequentially; and when there is a feature point to which a corresponding symbol whose display position has already been set is assigned, adjusting, at the time of setting a display position of a corresponding symbol to be assigned subsequently, the display position of the corresponding symbol to be assigned subsequently in such a manner that a display line connecting the corresponding symbol to be assigned subsequently and a feature point to which the corresponding symbol is assigned does not cross or overlap with a display line connecting the corresponding symbol whose display position has already been set and the feature point to which the corresponding symbol is assigned.

In the matching result display device of the present invention, it is preferable that the display position setting unit further adjusts display positions of the same corresponding symbols in the at least two pieces of image data so as to coincide with each other. In the matching result display method of the present invention, it is preferable that, in the display position setting step, display positions of the same corresponding symbols in the at least two pieces of image data further are adjusted so as to coincide with each other.

In the matching result display device of the present invention, the image data subjected to matching preferably is at least one of a fingerprint and a palm print. Also, in the matching result display method of the present invention, the image data subjected to matching preferably is at least one of a fingerprint and a palm print.

Next, the matching result display device, matching result display method, program, and recording medium according to the present invention will be described by way of embodiments. It is to be noted, however, that the present invention is by no means limited to the following embodiments.

Embodiment 1

Figure 2:
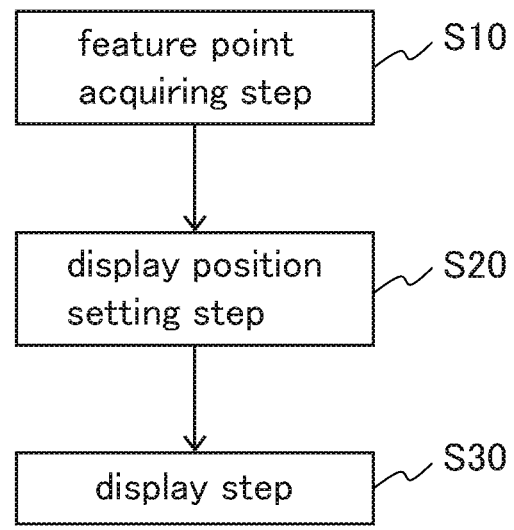
FIG. 2 is a flowchart depicting processing performed by the matching result display device of the present invention.

FIG. 1 is a block diagram showing an example of the configuration of the matching result display device of the present invention. FIG. 2 is a flowchart depicting the matching result display method of the present invention. As shown in FIG. 1, this matching result display device 100 includes a feature point acquiring unit 10, a display position setting unit 20, and a display unit 30. The present invention is used, for example, during a process of displaying a matching result after matching of a latent palm print or the like collected on a crime scene against a database has been requested.

The feature point acquiring unit 10 acquires a plurality of feature points common to at least two pieces of image data to be matched against each other (a feature point acquiring step: Step S10). The at least two pieces of image data may include, for example: matching target data, which is image data of a latent palm print or a latent fingerprint; and reference data, which is image data of a candidate registered palm print or a candidate registered fingerprint accumulated in a database. The feature point acquiring unit 10 acquires a plurality of feature points common to matching target image data of a collected object to be subjected to matching and reference image data extracted from image data accumulated to form a database and having feature points similar to those in the matching target image data. Two pieces of image data may be compared with each other for matching, or three or more pieces of image data may be compared with each other for matching.

Next, the display position setting unit 20 sets display positions of corresponding symbols to be assigned to the feature points common to the at least two pieces of image data in such a manner that, when the same corresponding symbols are assigned to corresponding feature points, respectively, a display line connecting each feature point and the corresponding symbol assigned thereto on each of the at least two piece of image data does not overlap with display lines connecting other feature points and corresponding symbols assigned thereto, respectively (a display position setting step: Step S20). In order to avoid overlap among display lines connecting a plurality of feature points and corresponding symbols assigned thereto, respectively, information regarding distribution of the feature points on each of the matching target image data and the reference image data is analyzed using a plurality of discrimination algorithms, and on the basis of the analysis result, display positions of the corresponding symbols on each of the images are determined.

Next, the display unit 30 provides the corresponding symbols at the display positions set by the display position setting unit 20 on each image and displays the feature points and the corresponding symbols assigned thereto in a state where they are connected with display lines, respectively (a display step: Step S30). Feature points that appear to agree with each other between the matching target data and the reference data may be given the same corresponding symbols, and, for example, the feature points may be displayed in a state where they are numbered in ascending order from those having the highest certainty of agreement.

Figure 3A:
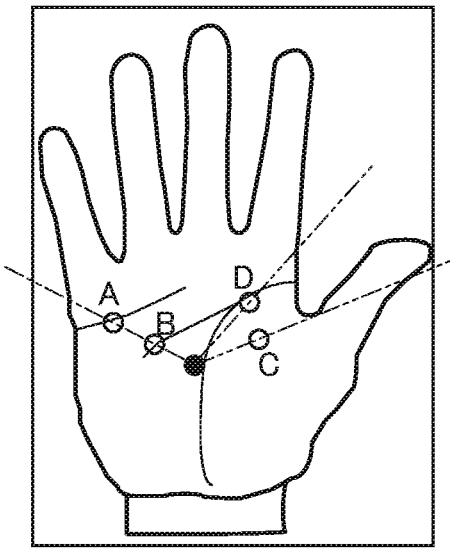
FIGS. 3A and 3B are schematic views illustrating an example of the display position setting step in the present invention.
Figure 3B:
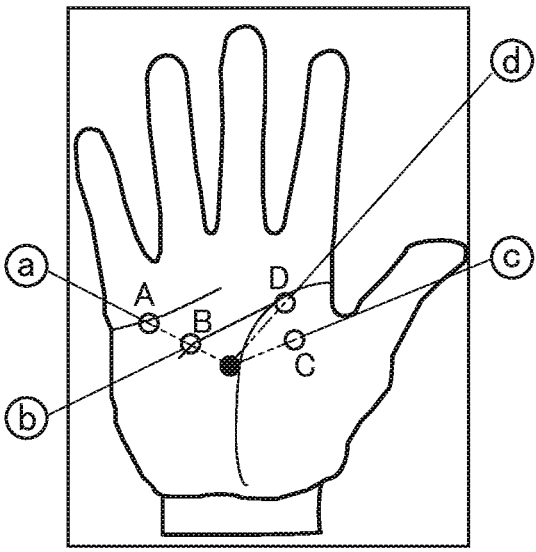

Examples of the discrimination algorithm include the one that determines straight lines that pass through the feature points, respectively, with the center of image data as a starting point, and sets, as corresponding symbol arrangement positions, positions that are on the straight lines within a region where corresponding symbols can be displayed (a corresponding symbol displayable region) on the image. The straight lines extend radially from the center of the image data. FIGS. 3A and 3B illustrate the display position setting step in the case where this discrimination algorithm is used. As shown in FIGS. 3A and 3B, for example, in the case where, among feature points A, B, C, and D, two feature points A and B are on the same straight line, another algorithm may be used in combination that sets, as a corresponding symbol arrangement position for the feature point A farther from the center, a position that is on the straight line within the corresponding symbol displayable region, and displaces a corresponding symbol arrangement position for the feature point B closer to the center to a position where a display line connecting the feature point B and the corresponding symbol assigned thereto does not cross straight lines that pass through other feature points, respectively, with the center as a starting point. At this time, the corresponding symbol arrangement position for the feature point B preferably is set to a closest possible position to the corresponding symbol arrangement position for the feature point A.

The display position setting unit 20 further may adjust display positions of the same corresponding symbols in the at least two pieces of image data so as to coincide with each other. When the matching target image data of a collected object to be subjected to matching and the reference image data having feature points similar to those in the matching target image data are displayed side by side for comparison, it is preferable that the same corresponding symbols are arranged at the same positions in the respective images, because this allows these two pieces of data to be checked more easily.

Figure 4:
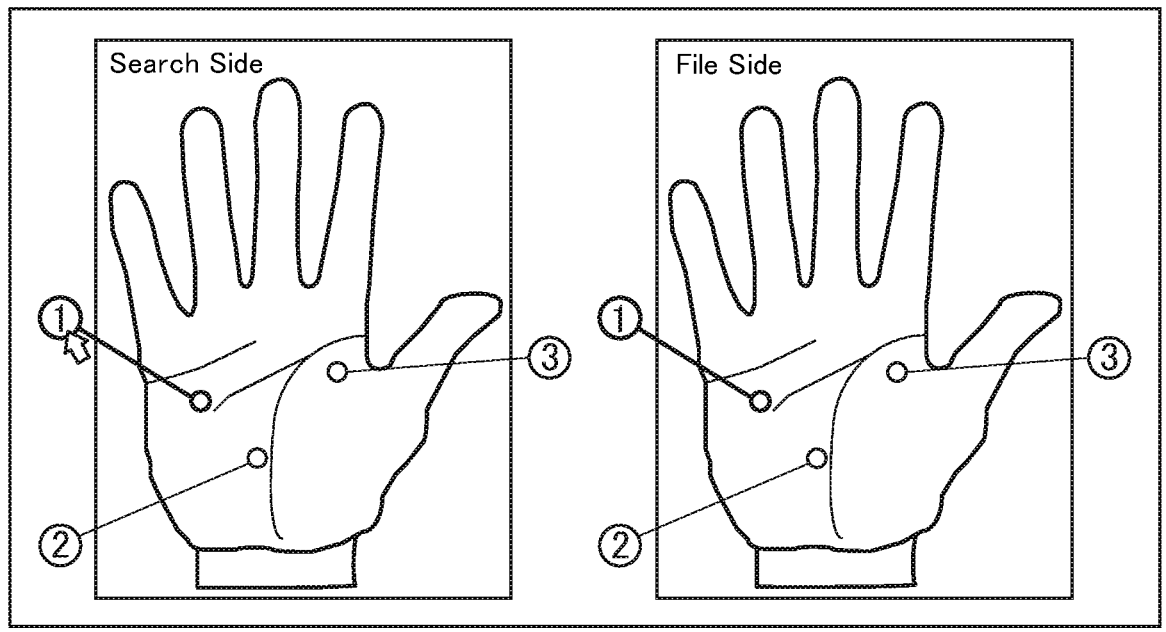
FIG. 4 is a schematic view illustrating an example of matching result display in the present invention.

In the case where forensic evidence may be displayed electronically, the matching result display device may be adapted so that the combination of paired feature points is shown clearly by selecting paired markers. The term "paired markers" as used herein refers to markers each applied to the combination of "a circle that encircles a feature point", "a corresponding symbol assigned to the feature point", and "a line connecting the circle and the corresponding symbol". The method for achieving clear indication may be such that, for example, when a mouse cursor is placed on one of the paired markers, the color of the marker is changed, and at the same time, the color of the other paired marker also is changed to the same color. In FIG. 4, the left image is matching target data and the right image is reference data, and they are in a state where a matching result as shown in FIG. 4 is obtained, for example. When a mouse cursor (the arrow in FIG. 4) is placed on the corresponding symbol numbered "1" in the left image, the color of the marker numbered "1" in the left image is changed. At the same time, the color of the marker numbered "1" corresponding thereto on the right image also is changed to the same color. With this configuration, the combination of the paired feature points can be displayed in a readily legible manner. Alternatively, the combination of the paired feature points may be enlarged partially by selecting the paired markers. For example, the matching result display device may be adapted so that, when a corresponding symbol on one of the images is clicked on a display, enlarged images of the feature points that correspond to this corresponding symbol are displayed on the right and left images.

Although the present embodiment is directed to the case where the matching target image data is a palm print, the present invention is not limited thereto and also is applicable to the case where the matching target image data is a fingerprint. Moreover, the present invention also is applicable to the case where the matching target image data is information for biometric identification, such as a vein or the iris, for example.

Embodiment 2

In Embodiment 2, the display position setting unit 20 acquires feature point distribution information for each of the at least two pieces of image data to set, on the basis of the feature point distribution information, the center point of distribution of the feature points for each of the at least two pieces of image data. The display position setting unit 20 then determines straight lines that pass through the plurality of feature points, respectively, with the center point as a starting point, and sets, as corresponding symbol arrangement positions, positions that are on the straight lines within a corresponding symbol displayable region on the image data.

The center point of distribution of the feature points set on the basis of the feature point distribution information may be, for example, a position corresponding to the center of gravity of the feature points. In Embodiment 2, a matching result can be displayed with display positions of the corresponding symbols being set in the same manner as in Embodiment 1, except that the center point in the distribution of the feature points is used instead of the center of the image data in Embodiment 1.

Although the above description is directed to the case where only one starting point is provided, the present invention is not limited thereto. For example, when there are two or more regions where the feature points are present at a high distribution density, the center points in the respective regions may be set to starting points. In this case, a straight line that passes through a feature point may be determined with the center point closest to the feature point as a starting point.

Embodiment 3

Figure 5A:
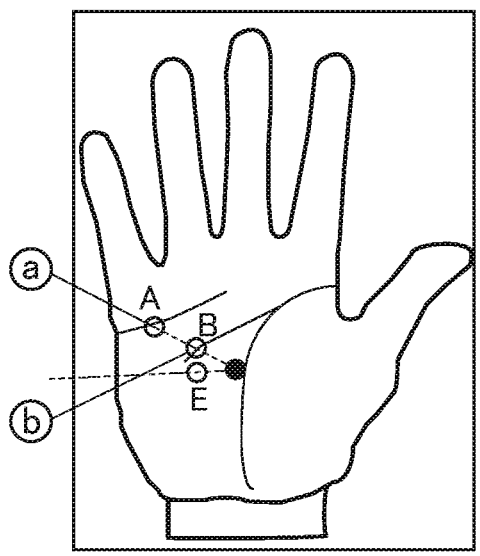
FIGS. 5A and 5B are schematic views illustrating another example of the display position setting step in the present invention.
Figure 5B:
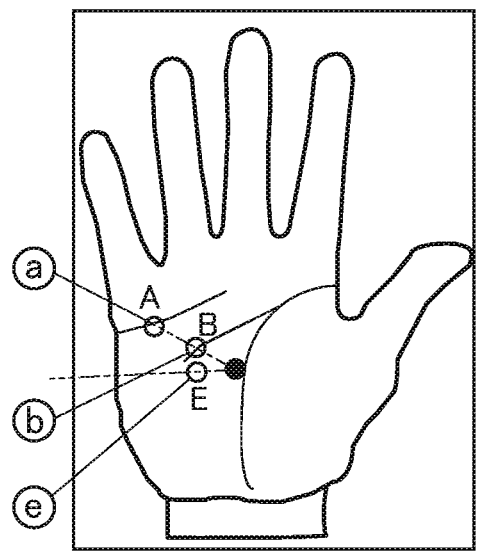
Figure 6A:
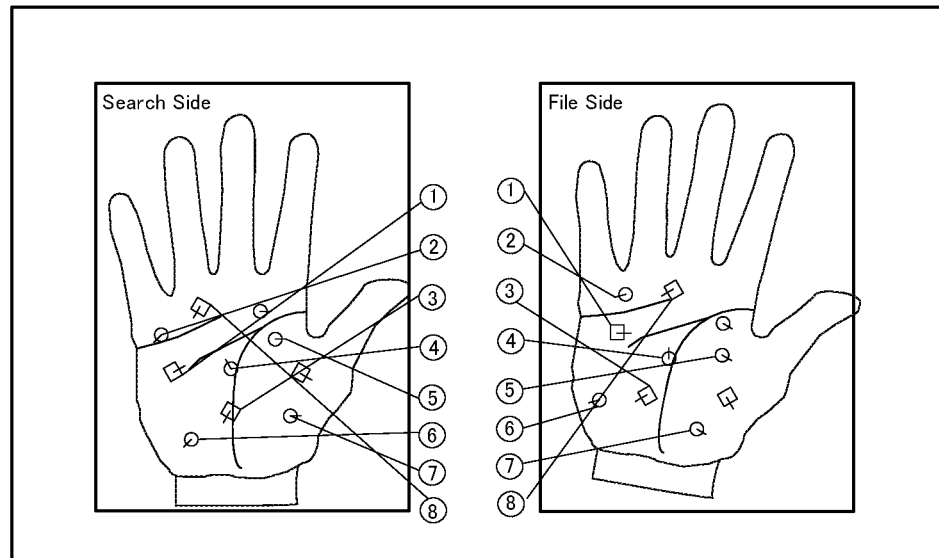
FIGS. 6A and 6B show an example of matching result display in related art.
Figure 6B:
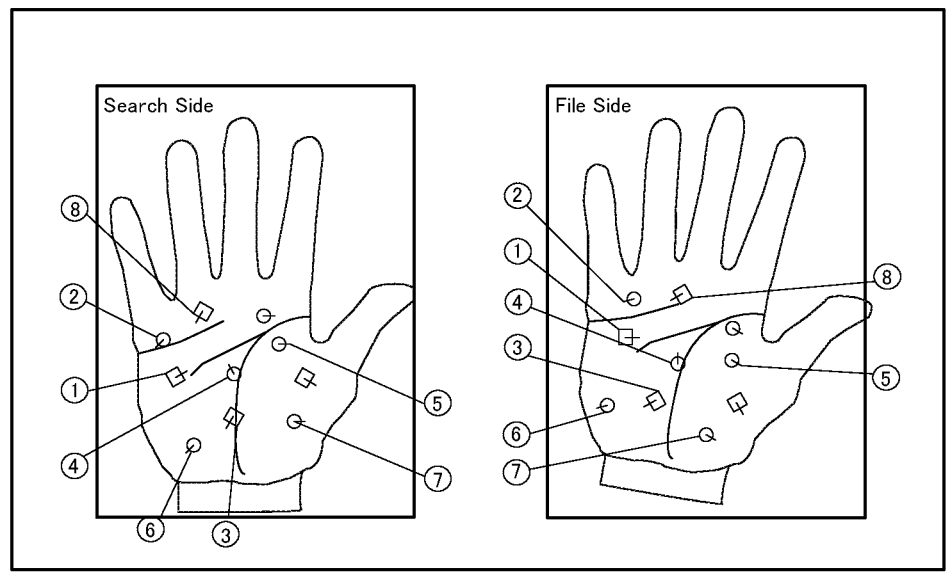

In Embodiment 3, the display position setting unit 20 sets display positions of corresponding symbols assigned to the plurality of feature points sequentially. At the time of setting a display position of a corresponding symbol to be assigned to a certain feature point, when there is a feature point to which a corresponding symbol whose display position has already been set is assigned, the display position setting unit 20 adjusts, at the time of setting a display position of a corresponding symbol to be assigned subsequently, the display position of the corresponding symbol to be assigned subsequently in such a manner that a display line connecting the corresponding symbol to be assigned subsequently and a feature point to which the corresponding symbol is assigned does not cross or overlap with a display line connecting the corresponding symbol whose display position has already been set and the feature point to which the corresponding symbol is assigned. For example, as in Embodiment 1 (FIGS. 3A and 3B), when two feature points A and B are present on the same straight line that passes through the feature points with the center of image data as a starting point, the display line connecting one of the feature points (the feature point B) and the corresponding symbol assigned thereto is arranged so as to be displaced from the straight line. As a result, regarding a feature point E for which a corresponding symbol arrangement position is to be set subsequently, the original position of a display line connecting the feature point E and a corresponding symbol assigned thereto may cross the display line for the feature point B ((a) in FIGS. 5A and 5B). In such a case, in order to prevent the display line connecting the feature point E and the corresponding symbol assigned thereto from crossing or overlapping with the display line connecting the feature point B and the corresponding symbol assigned thereto whose display position has already been set, a display position of the corresponding symbol to be assigned subsequently for the feature point E may be adjusted as shown in (b) in FIGS. 5A and 5B.

Embodiment 4

A program according to the present embodiment is a program that can execute the above-described matching result display method on a terminal. The program according to the present embodiment may be recorded on a recording medium, for example. The recording medium is not particularly limited, and examples thereof include a random access memory (RAM), a read only memory (ROM), a hard disk (HD), an optical disc, and a floppy (registered trademark) disc (FD).

INDUSTRIAL APPLICABILITY

According to the present invention, it is possible to provide a matching result display device, a matching result display method, a program, and a recording medium, which allow, at the time of displaying feature points of objects determined as matching on the basis of matching result information provided by a matching system, visual check of the displayed feature points to be performed easily. The present invention can be applied effectively not only to preparation of forensic evidence documents but also to a broad range of uses.

While the present invention has been described above with reference to illustrative embodiments, the present invention is by no means limited thereto. Various changes and modifications that may become apparent to those skilled in the art may be made in the configuration and specifics of the present invention without departing from the scope of the present invention.

This application claims priority from Japanese Patent Application No. 2012-74711 filed on Mar. 28, 2012. The entire disclosure of this Japanese patent application is incorporated herein by reference.

EXPLANATION OF REFERENCE NUMERALS

100: matching result display device
10: feature point acquiring unit
20: display position setting unit
30: display unit
A to E: feature points
a to e: corresponding symbols that correspond to feature points A to E, respectively

The invention claimed is:
1. A matching result display device, comprising:
a user interface;
a memory storing instructions; and
one or more processors coupled to the memory, wherein the one or more processors are configured to execute the instructions to:
acquire a first plurality of feature points in a first image;
calculate a first center point of the first plurality of feature points in the first image;
calculate to locate a first plurality of symbols respectively corresponding to the first plurality of feature points;
connect the first plurality of feature points to the first plurality of symbols by a respective first plurality of lines extending from the first center point, wherein the first plurality of lines do not intersect each other;
acquire a second plurality of feature points in a second image, the second plurality of feature points respectively corresponding to the first plurality of feature points;
calculate a second center point of the second plurality of feature points in the second image;
calculate to locate a second plurality of symbols respectively corresponding to the second plurality of feature points;
connect the second plurality of feature points to the second plurality of symbols by a respective second plurality of lines extending from the second center point, wherein the second plurality of lines do not intersect each other;
display, on the user interface with the first image, the first plurality of feature points, the first plurality of symbols, and the first plurality of lines, the first plurality of symbols being displayed at a first location of the user interface;
display, on the user interface with the second image, the second plurality of feature points, the second plurality of symbols, and the second plurality of lines, the second plurality of symbols being displayed at a location different from the first location;

arrange display positions of the first plurality of feature points, the first plurality of symbols and the first plurality of lines in the first image, and display positions of the second plurality of feature points, the second plurality of symbols and the second plurality of lines in the second image corresponding to the first plurality of feature points, the first plurality of symbols and the first plurality of lines, at the same positions respectively in the first image and the second image;

calculate certainties of feature points based on degrees of matching between the first plurality of feature points and the second plurality of feature points; and select a paired marker to show a combination of one of the first plurality of feature points and one of the second plurality of feature points corresponding to the one of the first plurality of feature points on the user interface, wherein:

the first image is a latent palm image and the second image is a candidate registered palm image accumulated in a database, or the first image is a latent fingerprint image and the second image is a candidate registered fingerprint image accumulated in a database; and the first plurality of symbols and the second plurality of symbols include numbers assigned in ascending order from feature points having higher certainties.

2. The matching result display device according to claim 1, wherein:

the one or more processors are configured to execute the instructions to display, on the user interface with the first image, the first plurality of symbols by:

displaying the first plurality of symbols within a first symbol displayable region around the first image, and the one or more processors are configured to execute the instructions to display, on the user interface with the second image, the second plurality of symbols by:

displaying the second plurality of symbols within a second symbol displayable region around the second image.

3. The matching result display device according to claim 1, wherein:

the one or more processors are configured to execute the instructions to calculate the first center point of the first plurality of feature points by:

acquiring first distribution information about the first plurality of feature points in the first image; and calculating the first center of the first image based on the first distribution information, and the one or more processors are configured to execute the instructions to calculate the second center point of the second plurality of feature points by:

acquiring second distribution information about the second plurality of feature points in the first image; and calculating the second center of the second image based on the second distribution information.

4. The matching result display device according to claim 3, wherein:

the one or more processors are configured to execute the instructions to calculate a center of gravity of the first plurality of feature points as the first center point; and the one or more processors are configured to execute the instructions to calculate a center of gravity of the second plurality of feature points as the second center point.

5. The matching result display device according to claim 1, wherein:

the one or more processors are configured to execute the instructions to calculate the center point of the first plurality of feature points by:

acquiring first distribution information about the first plurality of feature points;

calculating first distribution density of the first plurality of feature points, on the basis of the first distribution information; and calculating a first center of the first image, when there are two or more regions where the first distribution density is high, on the basis of the first distribution information of each of the regions having the high first distribution density, and the one or more processors are configured to execute the instructions to calculate the center point of the second plurality of feature points by:

acquiring second distribution information about the second plurality of feature points;

calculating second distribution density of the second plurality of feature points, on the basis of the second distribution information; and calculating a second center of the second image, when there are two or more regions where the second distribution density is high, on the basis of the second distribution information of each of the regions having the high second distribution density.

6. The matching result display device according to claim 1, wherein:

the one or more processors are configured to execute the instructions to sequentially calculate to locate the first plurality of symbols respectively corresponding to the first plurality of feature points in the first image, and the one or more processors are configured to execute the instructions to sequentially calculate to locate the second plurality of symbols respectively corresponding to the second plurality of feature points in the second image.

7. The matching result display device according to claim 1, wherein the display comprises:

a first change of color of one of the first plurality of symbols connected to the selected one of the first plurality of feature points, and a second change of color of one of the second plurality of symbols connected to the corresponding one of the second plurality of feature points.

8. The matching result display device according to claim 7, wherein the first and second changes of color include changes to a same color.

9. A matching result display method performed by a processor, comprising:

acquiring a first plurality of feature points in a first image;

calculating a first center point of the first plurality of feature points in the first image;

calculating to locate a first plurality of symbols respectively corresponding to the first plurality of feature points;

connecting the first plurality of feature points to the first plurality of symbols by a respective first plurality of lines extending from the first center point, wherein the first plurality of lines do not intersect each other;

acquiring a second plurality of feature points in a second image, the second plurality of feature points respectively corresponding to the first plurality of feature points;

calculating a second center point of the second plurality of feature points in the second image;

calculating to locate a second plurality of symbols respectively corresponding to the second plurality of feature points;

connecting the second plurality of feature points to the second plurality of symbols by a respective second plurality of lines extending from the second center point, wherein the second plurality of lines do not intersect each other;

displaying, on a user interface with the first image, the first plurality of feature points, the first plurality of symbols, and the first plurality of lines, the first plurality of symbols being displayed at a first location of the user interface;

displaying, on the user interface with the second image, the second plurality of feature points, the second plurality of symbols, and the second plurality of lines, the second plurality of symbols being displayed at a location different from the first location;

arranging display positions of the first plurality of feature points, the first plurality of symbols and the first plurality of lines in the first image, and display positions of the second plurality of feature points, the second plurality of symbols and the second plurality of lines in the second image corresponding to the first plurality of feature points, the first plurality of symbols and the first plurality of lines, at the same positions respectively in the first image and the second image;

calculating certainties of feature points based on degrees of matching between the first plurality of feature points and the second plurality of feature points; and selecting a paired marker to show a combination of one of the first plurality of feature points and one of the second plurality of feature points corresponding to the one of the first plurality of feature points on the user interface, wherein:

the first image is a latent palm image and the second image is a candidate registered palm image accumulated in a database, or the first image is a latent fingerprint image and the second image is a candidate registered fingerprint image accumulated in a database; and the first plurality of symbols and the second plurality of symbols include numbers assigned in ascending order from feature points having higher certainties.

10. The matching result display method according to claim 9, wherein:

displaying, on the user interface with the first image, the first plurality of symbols includes:

displaying the first plurality of symbols within a first symbol displayable region around the first image, and displaying, on the user interface with the second image, the second plurality of symbols includes:

displaying the second plurality of symbols within a second symbol displayable region around the second image.

11. The matching result display method according to claim 9, wherein:

calculating the first center point of the first plurality of feature points includes:

acquiring first distribution information about the first plurality of feature points in the first image; and calculating the first center of the first image based on the first distribution information, and calculating the second center point of the second plurality of feature points includes:

acquiring second distribution information about the second plurality of feature points in the first image; and calculating the second center of the second image based on the second distribution information.

12. The matching result display method according to claim 11, wherein:

a center of gravity of the first plurality of feature points is calculated as the first center point; and a center of gravity of the second plurality of feature points is calculated as the second center point.

13. The matching result display method according to claim 9, wherein:

calculating the center point of the first plurality of feature points includes:

acquiring first distribution information about the first plurality of feature points;

calculating first distribution density of the first plurality of feature points, on the basis of the first distribution information; and calculating a first center of the first image, when there are two or more regions where the first distribution density is high, on the basis of the first distribution information of each of the regions having the high first distribution density, and calculating the center point of the second plurality of feature points includes:

acquiring second distribution information about the second plurality of feature points;

calculating second distribution density of the second plurality of feature points, on the basis of the second distribution information; and calculating a second center of the second image, when there are two or more regions where the second distribution density is high, on the basis of the second distribution density of each of the regions having the high second distribution density.

14. The matching result display method according to claim 9, wherein:

calculating to locate the first plurality of symbols respectively corresponding to the first plurality of feature points includes:

sequentially calculating to locate the first plurality of symbols respectively corresponding to the first plurality of feature points in the first image, and calculating to locate the second plurality of symbols respectively corresponding to the second plurality of feature points includes:

sequentially calculating to locate the second plurality of symbols respectively corresponding to the second plurality of feature points in the second image.

15. The matching result display method according to claim 9, wherein the display comprises:

a first change of color of one of the first plurality of symbols connected to the selected one of the first plurality of feature points, and a second change of color of one of the second plurality of symbols connected to the corresponding one of the second plurality of feature points.

16. The matching result display method according to claim 15, wherein the first and second changes of color include changes to a same color.

17. A non-transitory computer-readable medium storing instructions which, when executed by one or more processors, cause the one or more processors to perform operations for matching result display, the operations comprising:

acquiring a first plurality of feature points in a first image;

calculating a first center point of the first plurality of feature points in the first image;

calculating to locate a first plurality of symbols respectively corresponding to the first plurality of feature points;

connecting the first plurality of feature points to the first plurality of symbols by a respective first plurality of lines extending from the first center point, wherein the first plurality of lines do not intersect each other;

acquiring a second plurality of feature points in a second image, the second plurality of feature points respectively corresponding to the first plurality of feature points;

calculating a second center point of the second plurality of feature points in the second image;

calculating to locate a second plurality of symbols respectively corresponding to the second plurality of feature points;

connecting the second plurality of feature points to the second plurality of symbols by a respective second plurality of lines extending from the second center point, wherein the second plurality of lines do not intersect each other;

displaying, on a user interface with the first image, the first plurality of feature points, the first plurality of symbols, and the first plurality of lines, the first plurality of symbols being displayed at a first location of the user interface;

displaying, on the user interface with the second image, the second plurality of feature points, the second plurality of symbols, and the second plurality of lines, the second plurality of symbols being displayed at a location different from the first location;

arranging display positions of the first plurality of feature points, the first plurality of symbols and the first plurality of lines in the first image, and display positions of the second plurality of feature points, the second plurality of symbols and the second plurality of lines in the second image corresponding to the first plurality of feature points, the first plurality of symbols and the first plurality of lines, at the same positions respectively in the first image and the second image;

calculating certainties of feature points based on degrees of matching between the first plurality of feature points and the second plurality of feature points; and selecting a paired marker to show a combination of one of the first plurality of feature points and one of the second plurality of feature points corresponding to the one of the first plurality of feature points on the user interface, wherein:

the first image is a latent palm image and the second image is a candidate registered palm image accumulated in a database, or the first image is a latent fingerprint image and the second image is a candidate registered fingerprint image accumulated in a database; and the first plurality of symbols and the second plurality of symbols include numbers assigned in ascending order from feature points having higher certainties.

18. The non-transitory computer-readable medium according to claim 17, wherein the display comprises:

a first change of color of one of the first plurality of symbols connected to the selected one of the first plurality of feature points, and a second change of color of one of the second plurality of symbols connected to the corresponding one of the second plurality of feature points.

19. The non-transitory computer-readable medium according to claim 18, wherein the first and second changes of color include changes to a same color.

* * * * *